US012083652B2

(12) United States Patent
Hanamura et al.

(10) Patent No.: US 12,083,652 B2
(45) Date of Patent: Sep. 10, 2024

(54) ELECTRIC POWER TOOL

(71) Applicant: Panasonic Intellectual Property Management Co., Ltd., Osaka (JP)

(72) Inventors: Kenji Hanamura, Osaka (JP); Masayuki Nakahara, Osaka (JP); Fumiiki Yoneda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 151 days.

(21) Appl. No.: 17/604,894

(22) PCT Filed: Jan. 30, 2020

(86) PCT No.: PCT/JP2020/003301

§ 371 (c)(1),
(2) Date: Oct. 19, 2021

(87) PCT Pub. No.: WO2020/217627

PCT Pub. Date: Oct. 29, 2020

(65) Prior Publication Data

US 2022/0193867 A1 Jun. 23, 2022

(30) Foreign Application Priority Data

Apr. 24, 2019 (JP) ................................ 2019-083352

(51) Int. Cl.
*B25B 21/02* (2006.01)
*B25B 23/147* (2006.01)
(Continued)

(52) U.S. Cl.
CPC .......... *B25B 21/02* (2013.01); *B25B 23/1475* (2013.01); *B25F 5/00* (2013.01)

(58) Field of Classification Search
CPC ................................ B25B 21/02; H02P 21/22
(Continued)

(56) References Cited

U.S. PATENT DOCUMENTS 9,579,777 B2 * 2/2017 Chen ........................ B25B 21/02
9,660,562 B2 * 5/2017 Yoo ......................... H02P 21/18
(Continued)

FOREIGN PATENT DOCUMENTS

CN 104076167 A 10/2014
JP H10-328952 A 12/1998
(Continued)

OTHER PUBLICATIONS

Extended European Search Report dated May 3, 2022 issued in the corresponding European Patent Application No. 20794392.9.
(Continued)

*Primary Examiner* — Thanh K Truong
*Assistant Examiner* — Patrick B Fry
(74) *Attorney, Agent, or Firm* — Rimon P.C.

(57) ABSTRACT

An electric power tool includes an electric motor (AC motor), an impact mechanism, an impact detecting unit, and a measuring unit. The impact mechanism performs an impact operation that generates impacting force by receiving motive power from the electric motor. The impact detecting unit determines whether or not the impact operation is being performed. The measuring unit measures at least one of a d-axis current or a q-axis current, each of which is supplied to the electric motor. The impact detecting unit determines, based on at least one of a measured value (current measured value) of the d-axis current or a measured value (current measured value) of the q-axis current, whether or not the impact operation is being performed. The measured values (current measured values) of the d-axis current and the q-axis current have been obtained by the measuring unit.

12 Claims, 8 Drawing Sheets

(51) Int. Cl.
*B25F 5/00* (2006.01)
*H02P 21/22* (2016.01)

(58) Field of Classification Search
USPC ........................................................ 173/2, 181
See application file for complete search history.

(56) References Cited

U.S. PATENT DOCUMENTS

| | | | | |
|---|---|---|---|---|
| 10,848,089 | B2 * | 11/2020 | Hano | F02D 15/02 |
| 10,870,444 | B2 * | 12/2020 | Kashima | H02P 21/22 |
| 2004/0100220 | A1 * | 5/2004 | Fu | B60L 15/00 318/700 |
| 2007/0000676 | A1 | 1/2007 | Arimura | |
| 2014/0285333 | A1 | 9/2014 | Imamura et al. | |
| 2015/0303842 | A1 | 10/2015 | Takano et al. | |
| 2016/0008961 | A1 | 1/2016 | Takano et al. | |
| 2018/0297179 | A1 | 10/2018 | Osada et al. | |
| 2019/0047614 | A1 * | 2/2019 | Kashima | H02P 25/03 |
| 2020/0021217 | A1 * | 1/2020 | Hano | H02M 1/0009 |
| 2020/0130153 | A1 | 4/2020 | Yoneda | |

FOREIGN PATENT DOCUMENTS

| | | | |
|---|---|---|---|
| JP | 2003-009598 | A | 1/2003 |
| JP | 2005-059177 | A | 3/2005 |
| JP | 2007-007784 | A | 1/2007 |
| JP | 2017-189067 | A | 10/2017 |
| WO | 2014/084158 | A1 | 6/2014 |
| WO | 2014/162862 | A1 | 10/2014 |
| WO | 2018/230141 | A1 | 12/2018 |

OTHER PUBLICATIONS

International Search Report and Written Opinion issued in International Patent Application No. PCT/JP2020/003301, dated Mar. 17, 2020; with partial English translation.
Chinese Office Action with English translation of the Search Report dated Mar. 9, 2023 issued in the corresponding Chinese Patent Application No. 202080030341.7.
European Office Action dated May 28, 2024 issued in the corresponding European Patent Application No. 20794392.9.

* cited by examiner

ELECTRIC POWER TOOL

CROSS-REFERENCE OF RELATED APPLICATIONS

This application is the U.S. National Phase under 35 U.S.C. § 371 of International Patent Application No. PCT/JP2020/003301, filed on Jan. 30, 2020, which in turn claims the benefit of Japanese Application No. 2019-083352, filed on Apr. 24, 2019, the entire disclosures of which Applications are incorporated by reference herein.

TECHNICAL FIELD

The present disclosure generally relates to an electric power tool, and more particularly relates to an electric power tool including an impact mechanism.

BACKGROUND ART

Patent Literature 1 discloses an electric power tool including an electric motor, an impact mechanism, and a control means. The electric motor is driven by performing PWM control on a semiconductor switching element. The impact mechanism either strikes or rotates an anvil with a hammer turned by the electric motor. The control means controls the rotation of the electric motor. Also, when the anvil is struck by the impact mechanism multiple times on end, the control means drives the electric motor with a duty cycle changed from a high value into a low value.

CITATION LIST

Patent Literature

Patent Literature 1: WO 2014/162862 A1

SUMMARY OF INVENTION

An object of the present disclosure is to provide an electric power tool including a novel means for determining whether or not the impact mechanism is performing any impact operation.

An electric power tool according to an aspect of the present disclosure includes an electric motor, an impact mechanism, an impact detecting unit, and a measuring unit. The impact mechanism performs an impact operation that generates impacting force by receiving motive power from the electric motor. The impact detecting unit determines whether or not the impact operation is being performed. The measuring unit measures at least one of a d-axis current or a q-axis current, each of which is supplied to the electric motor. The impact detecting unit determines, based on at least one of a measured value of the d-axis current or a measured value of the q-axis current, whether or not the impact operation is being performed. The measured value of the d-axis current and the measured value of the q-axis current have been obtained by the measuring unit.

DESCRIPTION OF EMBODIMENTS

Embodiments of an electric power tool 1 will now be described in detail with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, FIG. 2 to be referred to in the following description of embodiments is a schematic representation. That is to say, the ratio of the dimensions (including thicknesses) of respective constituent elements illustrated in FIG. 2 does not always reflect their actual dimensional ratio.

(1) Overview

Figure 1:
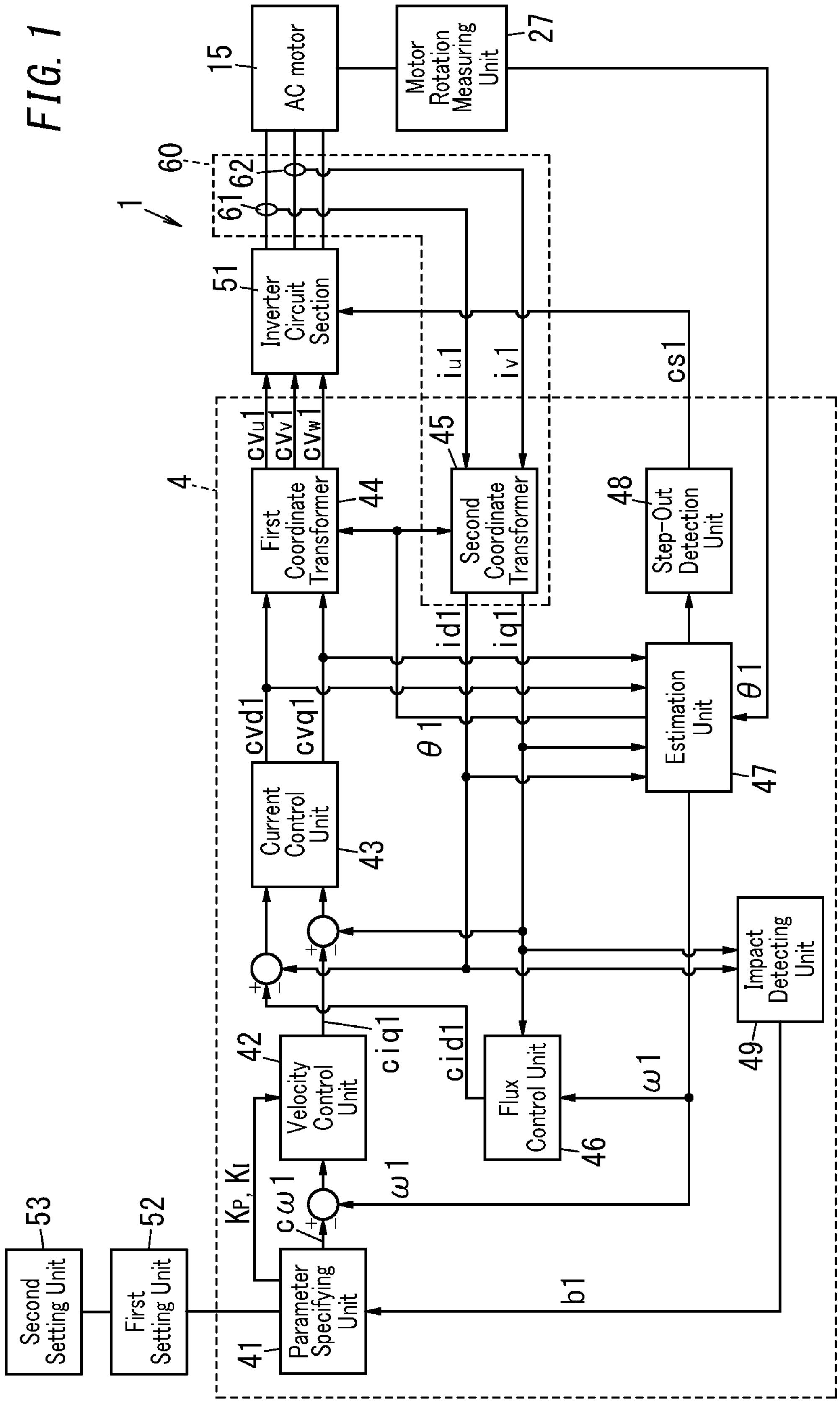
FIG. 1 is a block diagram of an electric power tool according to an exemplary embodiment.
Figure 2:
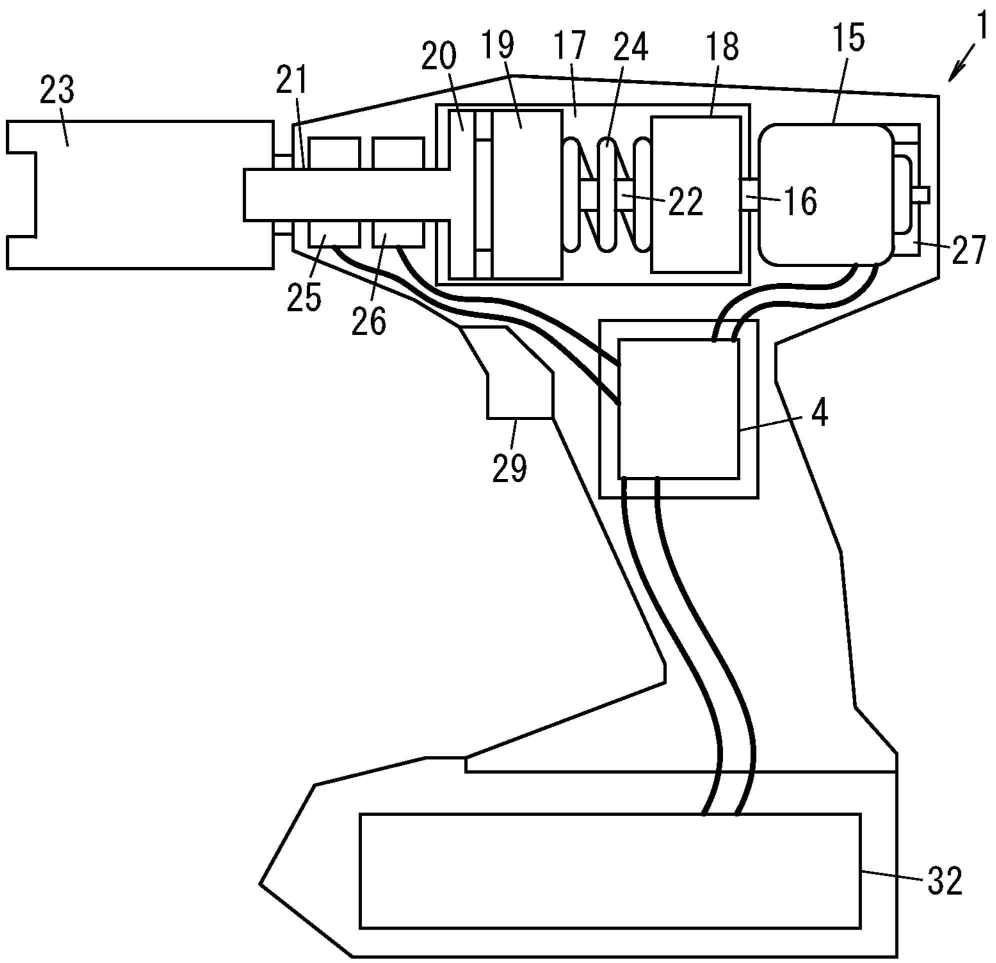
FIG. 2 is a schematic representation of the electric power tool.

An electric power tool 1 according to an exemplary embodiment may be used as, for example, an impact screwdriver or an impact wrench. The electric power tool 1 includes an AC motor 15 (electric motor), an impact mechanism 17, and a control unit 4 as shown in FIGS. 1 and 2. The AC motor 15 may be a brushless motor, for example. In particular, the AC motor 15 according to this embodiment is a synchronous motor. More specifically, the AC motor 15 may be implemented as a permanent magnet synchronous motor (PMSM). The impact mechanism 17 performs an impact operation that generates impacting force by receiving motive power from the AC motor 15. The control unit 4 performs feedback control on the operation of the AC motor 15. The control unit 4 includes an impact detecting unit 49. The impact detecting unit 49 determines whether or not the impact mechanism 17 is performing any impact operation.

In the following description, a period before the impact mechanism 17 starts the impact operation will be hereinafter referred to as a "preceding period" and a period after the impact detecting unit 49 has detected that the impact mechanism 17 has started the impact operation will be hereinafter referred to as a "following period." In the following period, the control unit 4 changes the target parameters in the preceding period into different target parameters. The target parameters include a control gain of the feedback control to be performed by the control unit 4. That is to say, when the impact detecting unit 49 detects the start of the impact operation, the control unit 4 changes the control gain of the feedback control. This allows controlling the AC motor 15 more precisely, compared to a situation where the control gain in the preceding period is equal to the control gain in the following period. In this embodiment, the control unit 4 may perform PI control, for example, and therefore, the control gain includes a proportional gain and an integral gain. The control unit 4 according to this embodiment makes the proportional gain in the following period different from the proportional gain in the preceding period and/or makes the integral gain in the following period different from the integral gain in the preceding period.

Note that the control gains to be changed by the control unit 4 when a transition is made from the preceding period to the following period are not limited to the proportional gain and the integral gain. If the control unit 4 performs PD control or PID control, then the control gains include a differential gain. The control unit 4 may change at least one of the proportional gain, the integral gain, or the differential gain when a transition is made from the preceding period to the following period.

The AC motor 15 includes a rotor having a permanent magnet and a stator having a coil. The control unit 4 performs vector control for controlling a flux-weakening current (d-axis current) supplied to the AC motor 15 and a torque current (q-axis current) supplied to the AC motor 15 independently of each other. As used herein, the "flux-weakening current" refers to a current that generates, in the coil, a magnetic flux that weakens the magnetic flux of the permanent magnet (weakening flux). In other words, the flux-weakening current is a current that generates, in the coil, a magnetic flux, of which the direction is opposite from the direction of the magnetic flux of the permanent magnet.

The electric power tool 1 further includes the AC motor 15 (electric motor), the impact mechanism 17, the impact detecting unit 49, and a measuring unit 60. The measuring unit 60 measures at least one of the d-axis current or q-axis current, each of which is supplied to the AC motor 15. In this embodiment, the measuring unit 60 measures both the d-axis current and the q-axis current. The impact detecting unit 49 determines, based on at least one of a measured value (current measured value id1) of the d-axis current or a measured value (current measured value iq1) of the q-axis current, whether or not the impact mechanism 17 is performing any impact operation. The measured value (current measured value id1) of the d-axis current and the measured value (current measured value iq1) of the q-axis current have been obtained by the measuring unit 60. This allows determining, even without using the measured value of an output current of a power supply 32 of the electric power tool 1, for example, whether or not the impact operation is being performed.

As used herein, the phrase "based on at least one of a measured value (current measured value id1) of the d-axis current or a measured value (current measured value iq1) of the q-axis current, each of which has been obtained by the measuring unit 60" has the following meaning. Specifically, if the measuring unit 60 obtains only the current measured value id1 out of the current measured values id1, iq1, this phrase means "based on the current measured value id1 obtained by the measuring unit 60." On the other hand, if the measuring unit 60 obtains only the current measured value iq1 out of the current measured values id1, iq1, this phrase means "based on the current measured value iq1 obtained by the measuring unit 60." Furthermore, if the measuring unit 60 obtains both the current measured values id1, iq1, this phrase means "based on only the current measured value id1 obtained by the measuring unit 60, based on only the current measured value iq1, or based on both the current measured values id1, iq1."

(2) Electric Power Tool

The electric power tool 1 includes the AC motor 15, a power supply 32, a driving force transmission mechanism 18, the impact mechanism 17, a socket 23, a trigger volume 29, the control unit 4, a torque measuring unit 26, a bit rotation measuring unit 25, and a motor rotation measuring unit 27 as shown in FIG. 2. In addition, the electric power tool 1 further includes a tip tool.

The impact mechanism 17 has an output shaft 21. The output shaft 21 is a member to rotate with the driving force transmitted from the AC motor 15. The socket 23 is a member, which is fixed to the output shaft 21 and to which the tip tool is attached removably. The electric power tool 1 is a tool for driving the tip tool with the driving force supplied from the AC motor 15. The tip tool (hereinafter also referred to as a "bit") may be a screwdriver or a drill, for example. A tip tool is selected from various types of tip tools according to the intended use and attached to the socket 23 to have some type of machining work done. Optionally, the tip tool may be directly attached to the output shaft 21.

The AC motor 15 is a drive source for driving the tip tool. The AC motor 15 includes an output shaft 16 for outputting rotational driving force. The power supply 32 is an AC power supply for supplying a current for driving the AC motor 15. The power supply 32 includes a single or a plurality of secondary batteries. The driving force transmission mechanism 18 regulates the rotational driving force of the AC motor 15 and outputs a desired torque. The driving force transmission mechanism 18 includes a drive shaft 22 as its output member.

The drive shaft 22 of the driving force transmission mechanism 18 is connected to the impact mechanism 17. The impact mechanism 17 transforms the rotational driving force supplied from the AC motor 15 via the driving force transmission mechanism 18 into a pulsed torque, thereby generating impacting force. The impact mechanism 17 includes a hammer 19, an anvil 20, an output shaft 21, and a spring 24. The hammer 19 is attached to the drive shaft 22 of the driving force transmission mechanism 18 via a cam mechanism. The anvil 20 is coupled to the hammer 19 and rotates along with the hammer 19. The spring 24 biases the hammer 19 toward the anvil 20. The anvil 20 is formed integrally with the output shaft 21. Alternatively, the anvil 20 may be formed separately from the output shaft 21 and fixed to the output shaft 21.

Unless a load (torque), of which the magnitude is equal to or greater than a predetermined value, is applied to the output shaft 21, the drive shaft 22 and the hammer 19 which are coupled together via the cam mechanism turn along with each other and the hammer 19 and the anvil 20 also turn along with each other. Thus, the output shaft 21 formed integrally with the anvil 20 turns accordingly. On the other hand, if a load, of which the magnitude is equal to or greater than the predetermined value, is applied to the output shaft 21, then the hammer 19 moves backward (i.e., moves away from the anvil 20) against the spring 24 while being regulated by the cam mechanism. At a point in time when the hammer 19 is decoupled from the anvil 20, the hammer 19 starts moving forward while turning, thus applying impacting force to the anvil 20 in the rotational direction and thereby turning the output shaft 21. In this manner, the impact mechanism 17 performs an impact operation of repeatedly bringing the hammer 19 and the anvil 20 into collision with each other, thereby repeatedly applying impacting force from the hammer 19 to the output shaft 21 via the anvil 20.

The trigger volume 29 is an operating member for accepting an operating command for controlling the rotation of the AC motor 15. The ON/OFF states of the AC motor 15 may be switched by pulling the trigger volume 29. In addition, the rotational velocity of the output shaft 21, i.e., the rotational velocity of the AC motor 15, is adjustable by the manipulative variable indicating how deep the trigger volume 29 has been pulled. Specifically, the greater the manipulative variable is, the higher the rotational velocity of the AC motor 15 becomes. The control unit 4 start or stops turning the AC motor 15 and controls the rotational velocity of the AC motor 15 according to the manipulative variable indicating how deep the trigger volume 29 has been pulled. In this electric power tool 1, the tip tool is attached to the socket 23. Controlling the rotational velocity of the AC motor 15 by operating the trigger volume 29 allows the rotational velocity of the tip tool to be controlled.

The electric power tool 1 according to this embodiment includes the socket 23, thus making the tip tool replaceable depending on the intended use. However, the tip tool does not have to be replaceable. Alternatively, the electric power tool 1 may also be designed to allow the use of only a particular type of tip tool.

The torque measuring unit 26 measures the operating torque of the AC motor 15. The torque measuring unit 26 may be a magnetostriction strain sensor which may detect torsion strain, for example. The magnetostriction strain sensor makes a coil, provided in a non-rotating portion of the AC motor 15, detect a variation in permeability corresponding to the strain caused by the application of a torque to the output shaft 16 of the AC motor 15 and outputs a voltage signal, of which the magnitude is proportional to the magnitude of the strain.

The bit rotation measuring unit 25 measures the rotational angle of the output shaft 21. In this case, the rotational angle of the output shaft 21 is equal to the rotational angle of the tip tool (bit). As the bit rotation measuring unit 25, a photoelectric encoder or a magnetic encoder may be adopted, for example.

The motor rotation measuring unit 27 measures the rotational angle of the AC motor 15. As the motor rotation measuring unit 27, a photoelectric encoder or a magnetic encoder may be adopted, for example.

(3) Control Unit

The control unit 4 includes a computer system including one or more processors and a memory. At least some of the functions of the control unit 4 are performed by making the processor of the computer system execute a program stored in the memory of the computer system. The program may be stored in the memory. The program may also be downloaded via a telecommunications line such as the Internet or distributed after having been stored in a non-transitory storage medium such as a memory card.

As shown in FIG. 1, the control unit 4 includes a parameter specifying unit 41, a velocity control unit 42, a current control unit 43, a first coordinate transformer 44, a second coordinate transformer 45, a flux control unit 46, an estimation unit 47, a step-out detection unit 48, and an impact detecting unit 49. In addition, the electric power tool 1 further includes an inverter circuit section 51, a first setting unit 52, a second setting unit 53, and a plurality of (e.g., two in the example illustrated in FIG. 1) current sensors 61, 62. The control unit 4 is used along with the inverter circuit section 51 and performs feedback control to control the operation of the AC motor 15.

Each of the plurality of current sensors 61, 62 includes, for example, a hall element current sensor or a shunt resistor element. The plurality of current sensors 61, 62 measure an electric current supplied from the power supply 32 to the AC motor 15 via the inverter circuit section 51. In this embodiment, three-phase currents (namely, a U-phase current, a V-phase current, and a W-phase current) are supplied to the AC motor 15. The plurality of current sensors 61, 62 measure currents in at least two phases. In FIG. 1, the current sensor 61 measures the U-phase current and outputs a current measured value $i_u$1 and the current sensor 62 measures the V-phase current and outputs a current measured value $i_v$1.

The estimation unit 47 performs time differentiation on the rotational angle θ1, measured by the motor rotation measuring unit 27, of the AC motor 15 to calculate an angular velocity ω1 of the AC motor 15 (i.e., the angular velocity of the output shaft 16).

The second coordinate transformer 45 performs, based on the rotational angle θ1, measured by the motor rotation measuring unit 27, of the AC motor 15, coordinate transformation on the current measured values $i_u$1, $i_v$1 measured by the plurality of current sensors 61, 62, thereby calculating current measured values id1, iq1. That is to say, the second coordinate transformer 45 transforms the current measured values $i_u$1, $i_v$1, corresponding to currents in two phases out of the currents in three phases, into a current measured value id1 corresponding to a magnetic field component (d-axis current) and a current measured value iq1 corresponding to a torque component (q-axis current).

The measuring unit 60 includes the two current sensors 61, 62 and the second coordinate transformer 45. The measuring unit 60 measures the d-axis current and the q-axis current supplied to the AC motor 15. That is to say, the currents in two phases measured by the two current sensors 61, 62 are transformed by the second coordinate transformer 45, thus obtaining measured values of the d-axis current and the q-axis current.

The impact detecting unit 49 determines whether or not the impact mechanism 17 is performing any impact operation. It will be described in detail later exactly how the impact detecting unit 49 determines whether or not the impact operation is being performed.

The parameter specifying unit 41 specifies parameters concerned with the control of the AC motor 15. On receiving an impact detection signal b1 from the impact detecting unit 49 that has detected that the impact mechanism 17 has started the impact operation, the parameter specifying unit 41 changes at least some target parameters, out of the parameters to be specified. The target parameters include at least a control gain of the feedback control. In addition, the target parameters also include upper and lower limit values of the command value (target value) of the velocity (angular velocity) of the AC motor 15. The target parameters further include the command value cω1 of the angular velocity of the AC motor 15.

The parameter specifying unit 41 determines the command value cω1 of the angular velocity of the AC motor 15. The parameter specifying unit 41 may set the command value cω1 at, for example, a magnitude corresponding to the manipulative variable indicating how deep the trigger volume 29 (see FIG. 2) has been pulled. That is to say, as the manipulative variable increases, the parameter specifying unit 41 increases the command value cω1 of the angular velocity accordingly. It will be described in detail later how the parameter specifying unit 41 performs the processing of specifying the control gain and the upper and lower limit values of the command value of the velocity of the AC motor 15.

The timing when the impact detecting unit 49 supplies the impact detection signal b1 to the parameter specifying unit 41 upon detecting that the impact mechanism 17 has started the impact operation will be hereinafter referred to as an "impact start timing." The impact start timing is the timing when the impact detecting unit 49 detects the impact operation for the first time since the AC motor 15 has started turning. The preceding period includes a period just before the impact start timing. The following period includes a period right after the impact start timing.

The velocity control unit 42 generates a command value ciq1 based on the difference between the command value cω1 generated by the parameter specifying unit 41 and the angular velocity ω1 calculated by the estimation unit 47. The command value ciq1 is a command value specifying the magnitude of a torque current (q-axis current) of the AC motor 15. The velocity control unit 42 determines the command value ciq1 to reduce the difference (deviation) between the command value cω1 and the angular velocity ω1.

The flux control unit 46 generates a command value cid1 based on the angular velocity ω1 calculated by the estimation unit 47 and the current measured value iq1 (q-axis current). The command value cid1 is a command value that specifies the magnitude of a flux-weakening current (d-axis current) of the AC motor 15.

The command value cid1 generated by the flux control unit 46 may be, for example, a command value that reduces the magnitude of a weakened flux to zero. The flux control unit 46 may generate the command value cid1 to reduce the magnitude of the weakened flux to zero either constantly or only as needed. When the command value cid1 of the flux-weakening current becomes greater than zero, a negative flux-weakening current flows through the AC motor 15, thus generating a weakened flux.

The current control unit 43 generates a command value cvd1 based on the difference between the command value cid1 generated by the flux control unit 46 and the current measured value id1 calculated by the second coordinate transformer 45. The command value cvd1 is a command value that specifies the magnitude of a d-axis voltage of the AC motor 15. The current control unit 43 determines the command value cvd1 to reduce the difference (deviation) between the command value cid1 and the current measured value id1.

In addition, the current control unit 43 also generates a command value cvq1 based on the difference between the command value ciq1 generated by the velocity control unit 42 and the current measured value iq1 calculated by the second coordinate transformer 45. The command value cvq1 is a command value that specifies the magnitude of a q-axis voltage of the AC motor 15. The current control unit 43 generates the command value cvq1 to reduce the difference (deviation) between the command value ciq1 and the current measured value iq1.

Figure 3:
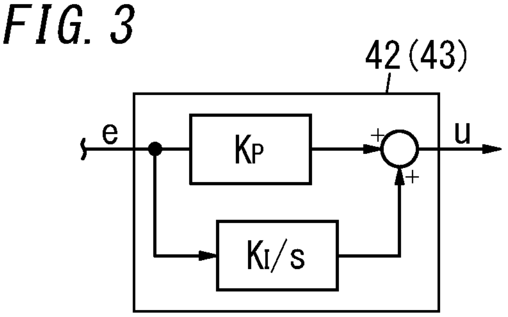
FIG. 3 is a block diagram of a main part of the electric power tool.

FIG. 3 is a block diagram representing, by a transfer function, the respective configurations of the velocity control unit 42 and the current control unit 43. In FIG. 3, $K_P$ represents a proportional gain, $K_I$ represents an integral gain, and e represents a deviation that has been input. In the velocity control unit 42, the deviation is the difference between the command value cω1 and the angular velocity ω1. In the current control unit 43, the deviation is the difference between the command value cid1 and the current measured value id1 when the command value cvd1 is generated and the difference between the command value ciq1 and the current measured value iq1 when the command value cvq1 is generated. In FIG. 3, u represents the manipulative variable. In the velocity control unit 42, u is a manipulative variable corresponding to the command value ciq1. In the current control unit 43, u is a manipulative variable corresponding to either the command value cvd1 or the command value cvq1. The manipulative variable in an s region is given by $u=(K_P+K_I/s)e$.

The parameter specifying unit 41 specifies the proportional gain and integral gain of the velocity control unit 42. The parameter specifying unit 41 makes at least one of the proportional gain or integral gain of the velocity control unit 42 different between the preceding period before the impact detecting unit 49 detects that the impact mechanism 17 has started the impact operation and the following period after the impact detecting unit 49 has detected that the impact mechanism 17 has started the impact operation. For example, the parameter specifying unit 41 may set the proportional gain of the velocity control unit 42 in the preceding period at a first proportional gain and the proportional gain of the velocity control unit 42 in the following period at a second proportional gain. The second proportional gain is smaller than the first proportional gain. That is to say, the parameter specifying unit 41 makes the proportional gain in the following period smaller than the proportional gain in the preceding period. In addition, the parameter specifying unit 41 may set the integral gain of the velocity control unit 42 in the preceding period at a first integral gain and the integral gain of the velocity control unit 42 in the following period at a second integral gain. The second integral gain is smaller than the first integral gain. That is to say, the parameter specifying unit 41 makes the integral gain in the following period smaller than the integral gain in the preceding period. The second integral gain may be one-tenth of the first integral gain, for example.

The parameter specifying unit 41 may change the target parameters (namely, the proportional gain and the integral gain) at the beginning of the following period, for example. The parameter specifying unit 41 keeps the proportional gain and integral gain of the velocity control unit 42 unchanged, once the proportional gain and integral gain of the velocity control unit 42 in the preceding period have been changed during the following period, from a point in time of the change through a point in time when the AC motor 15 stops running. That is to say, once the proportional gain of the velocity control unit 42 has become equal to the second proportional gain, the proportional gain of the velocity control unit 42 will be maintained at the second proportional gain until the user reduces the manipulative variable of the trigger volume 29 to zero to stop the AC motor 15. In addition, once the integral gain of the velocity control unit 42 has become equal to the second integral gain, the integral gain of the velocity control unit 42 will be maintained at the second integral gain until the user reduces the manipulative variable of the trigger volume 29 to zero to stop the AC motor 15.

Also, the parameter specifying unit 41 specifies the upper and lower limit values of the velocity of the AC motor 15. The command value of the velocity is limited to a value between the upper limit value and the lower limit value. In this embodiment, the command value cω1 of the angular velocity of the AC motor 15 is controlled, so that the command value of the velocity of the AC motor 15 is controlled eventually. That is to say, the parameter specifying unit 41 specifies the upper and lower limit values of the command value cω1 of the angular velocity of the AC motor 15.

The parameter specifying unit 41 makes the upper limit value of the command value cω1 of the angular velocity in the preceding period smaller than the upper limit value of the command value cω1 of the angular velocity in the following period. The parameter specifying unit 41 may set the upper limit value of the command value cω1 of the angular velocity in the preceding period at NA1×2π/60 [rad/s] (where NA1 is a value falling within the range from approximately 10000 to 20000), for example. The parameter specifying unit 41 may set the upper limit value of the command value cω1 of the angular velocity in the following period at NA2×2π/60 [rad/s] (where NA2<NA1 and NA2 is a value falling within the range from approximately 10000 to 20000), for example. In other words, the parameter specifying unit 41 sets the upper limit value of the command value of the number of revolutions of the AC motor 15 (i.e., the number of revolutions of the output shaft 16) in the preceding period at NA1 [rpm] and sets the upper limit value of the command value of the number of revolutions in the following period at NA2 [rpm]. In this embodiment, the lower limit value of the command value cω1 of the angular velocity is always fixed at 0 [rad/s]. That is to say, in the preceding period, the parameter specifying unit 41 restricts the command value cω1 of the angular velocity to a first restricted range between the first upper limit value (NA1×2π/60 [rad/s]) and the first lower limit value (0 [rad/s]). On the other hand, in the following period, the parameter specifying unit 41 restricts the command value cω1 of the angular velocity to a second restricted range between the second upper limit value (NA2×2π/60 [rad/s]) and the second lower limit value (0 [rad/s]). The second restricted range is different from the first restricted range.

The parameter specifying unit 41 may change the target parameter (namely, the upper limit value of the command value cω1 of the angular velocity) at the beginning of the following period, for example. The parameter specifying unit 41 keeps the upper limit value of the command value cω1 of the angular velocity unchanged, once the upper limit value of the command value cω1 of the angular velocity in the preceding period has been changed during the following period, from a point in time of the change through a point in time when the AC motor 15 stops running That is to say, once the upper limit value of the command value cω1 of the angular velocity has become equal to the second upper limit value, the upper limit value of the command value cω1 of the angular velocity will be maintained at the second upper limit value until the user reduces the manipulative variable of the trigger volume 29 to zero to stop the AC motor 15.

The first setting unit 52 and the second setting unit 53 accept a command entered to determine the target parameters in the following period (e.g., the proportional gain and integral gain (second proportional gain and the second integral gain) of the velocity control unit 42 and the upper limit value (second upper limit value) of the command value cω1 of the angular velocity in this example).

The first setting unit 52 is a memory for storing, for example, the second proportional gain, the second integral gain, and the second upper limit value. More specifically, the first setting unit 52 may be implemented as, for example, a read-only memory (ROM), a random-access memory (RAM), or an electrically erasable programmable read-only memory (EEPROM). Storing the second proportional gain, the second integral gain, and the second upper limit value in the first setting unit 52 during a design stage or manufacturing process of the electric power tool 1 allows the second proportional gain, the second integral gain, and the second upper limit value to be determined. That is to say, at least during the design stage or manufacturing process of the electric power tool 1, the first setting unit 52 accepts a command entered to determine the target parameters in the following period. During the operation of the electric power tool 1, the parameter specifying unit 41 reads out the second proportional gain, the second integral gain, and the second upper limit value from the first setting unit 52.

The second setting unit 53 accepts the user's command entered to determine the target parameters in the following period (e.g., the proportional gain and the integral gain (second proportional gain and the second integral gain) of the velocity control unit 42 and the upper limit value (second upper limit value) of the command value cω1 of the angular velocity) in this example). That is to say, the second setting unit 53 accepts a command entered to determine the target parameters in the following period at least after the electric power tool 1 has been manufactured. The second setting unit 53 is an input interface such as a button, a lever, or a touchscreen panel display. The user may switch the second proportional gain from one of at least two values to the other or another by operating the second setting unit 53. In addition, the user may also switch the second integral gain from one of at least two values to the other or another by operating the second setting unit 53. Furthermore, the user may switch the second upper limit value from one of at least two values to the other or another by operating the second setting unit 53. As used herein, the phrase "accept the user's command" means that the second setting unit 53 has at least the capability of accepting the command entered by the user. That is to say, the person who actually enters the command does not have to be the user him- or herself but may also be somebody else (such as an employee of the manufacturer of the electric power tool 1).

The first coordinate transformer 44 performs coordinate transformation on the command values cvd1, cvq1 based on the rotational angle θ1, measured by the motor rotation measuring unit 27, of the AC motor 15 to calculate command values $cv_u$1, $cv_v$1, $cv_w$1. Specifically, the first coordinate transformer 44 transforms the command value cvd1 for a magnetic field component (d-axis voltage) and the command value cvq1 for a torque component (q-axis voltage) into command values $cv_u$1, $cv_v$1, $cv_w$1 corresponding to voltages in three phases. Specifically, the command value $cv_u$1 corresponds to a U-phase voltage, the command value $cv_v$1 corresponds to a V-phase voltage, and the command value $cv_w$1 corresponds to a W-phase voltage.

The inverter circuit section 51 supplies voltages in three phases, corresponding to the command values $cv_u$1, $cv_v$1, $cv_w$1, respectively, to the AC motor 15. The control unit 4 controls the power to be supplied to the AC motor 15 by performing pulse width modulation (PWM) control on the inverter circuit section 51.

The AC motor 15 is driven with the power (voltages in three phases) supplied from the inverter circuit section 51, thus generating rotational driving force.

As a result, the control unit 4 controls the angular velocity of the AC motor 15 such that the angular velocity of the AC motor 15 becomes an angular velocity corresponding to the command value cω1 generated by the parameter specifying unit 41.

The step-out detection unit 48 detects a step-out (loss of synchronism) of the AC motor 15 based on the current measured values id1, iq1 acquired from the second coordinate transformer 45 and the command values cvd1, cvq1 acquired from the current control unit 43. On detecting the step-out, the step-out detection unit 48 transmits a stop signal cs1 to the inverter circuit section 51, thus stopping the supply of power from the inverter circuit section 51 to the AC motor 15.

(4) Impact Detection

Figure 4:
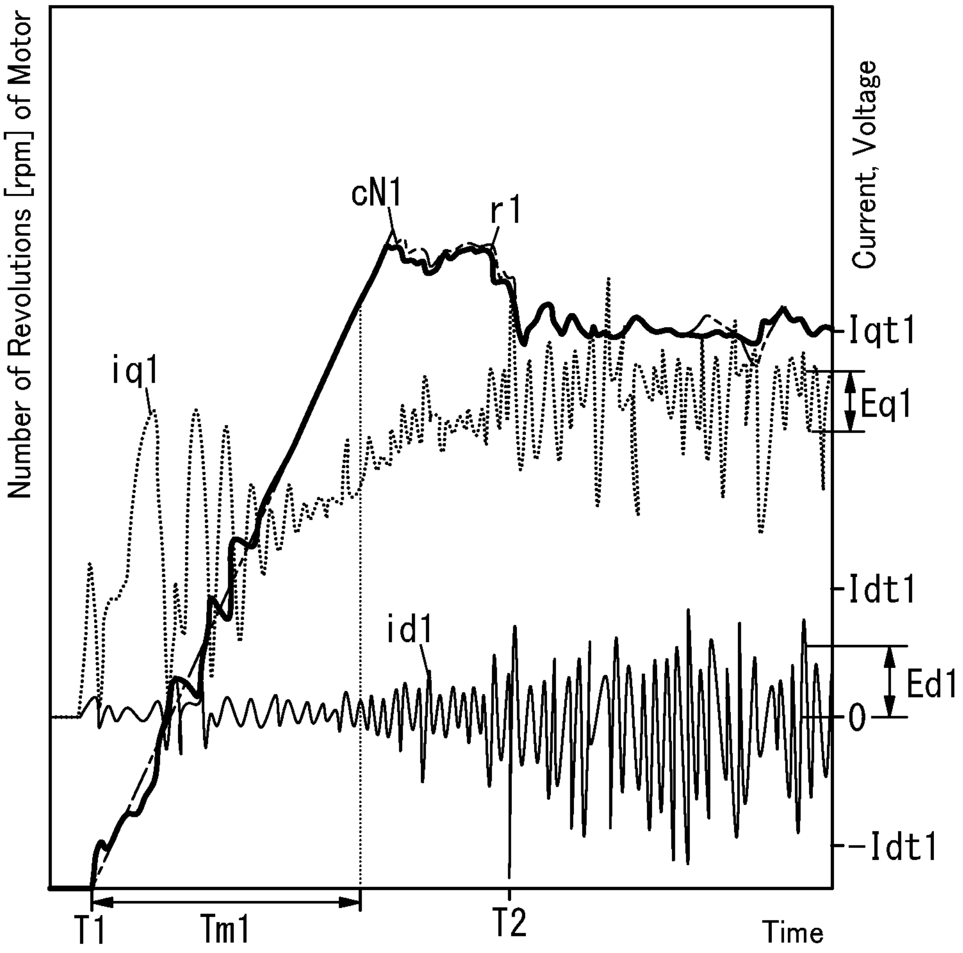
FIG. 4 is a graph showing a first exemplary operation of the electric power tool.
Figure 5:
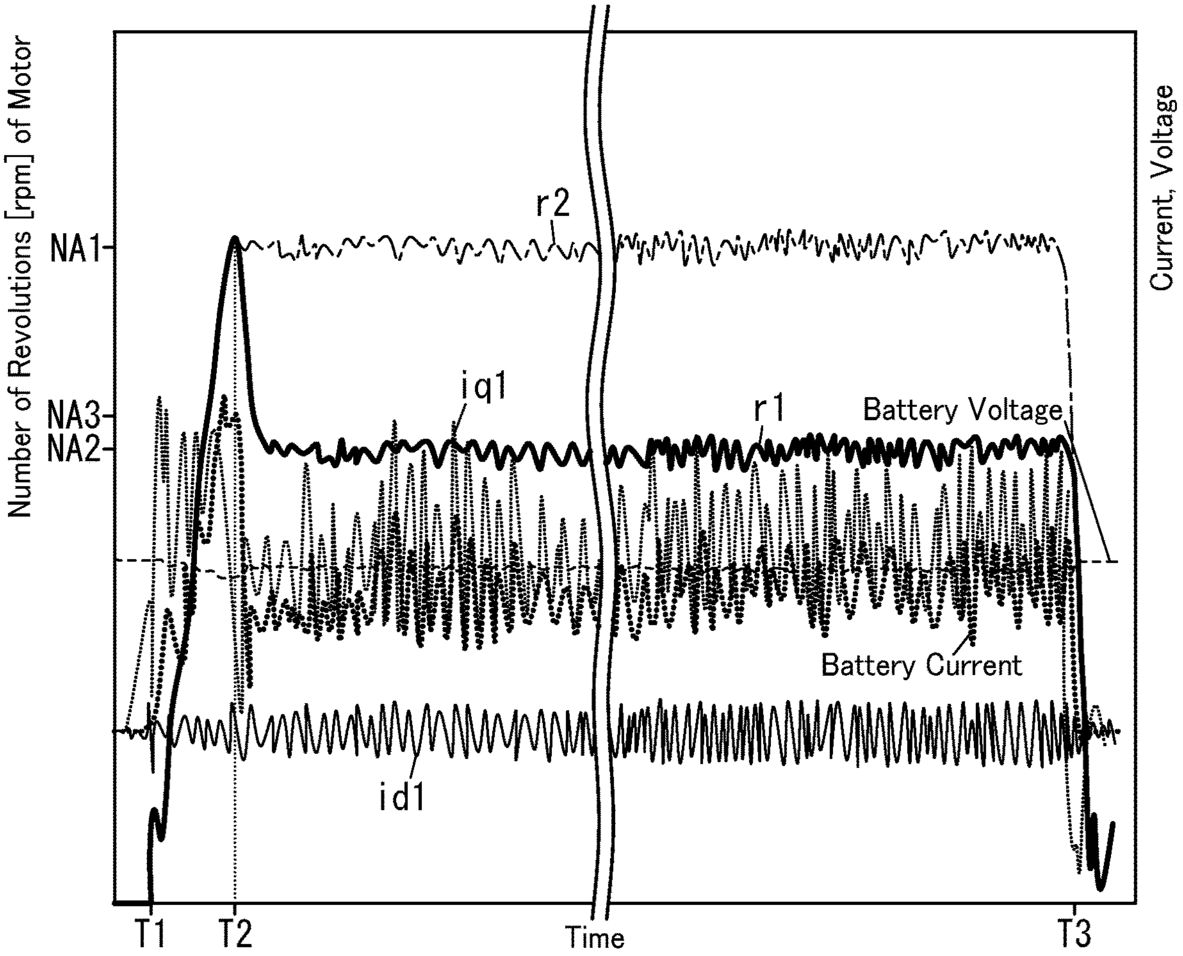
FIG. 5 is a graph showing a second exemplary operation of the electric power tool.
Figure 6:
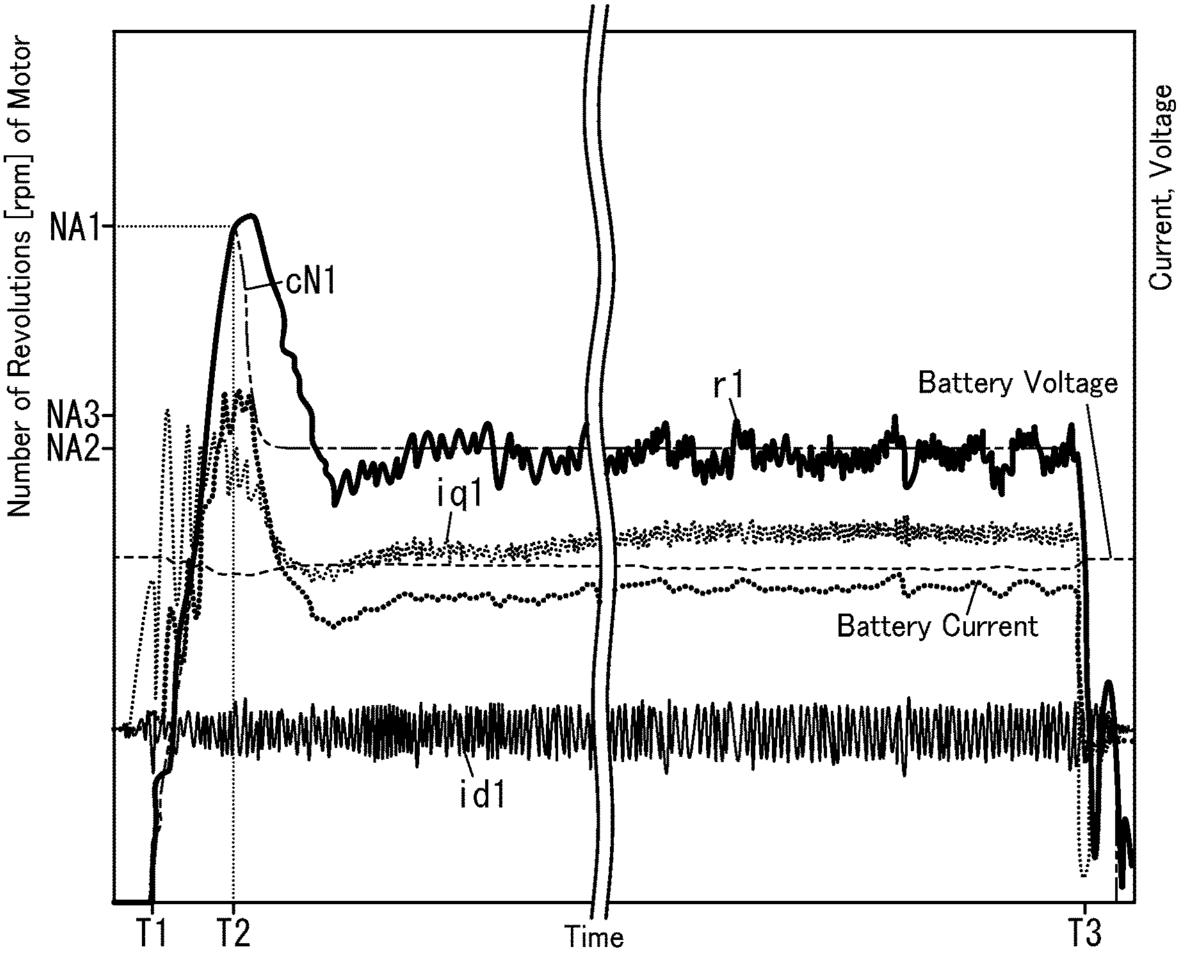
FIG. 6 is a graph showing a third exemplary operation of the electric power tool.
Figure 7:
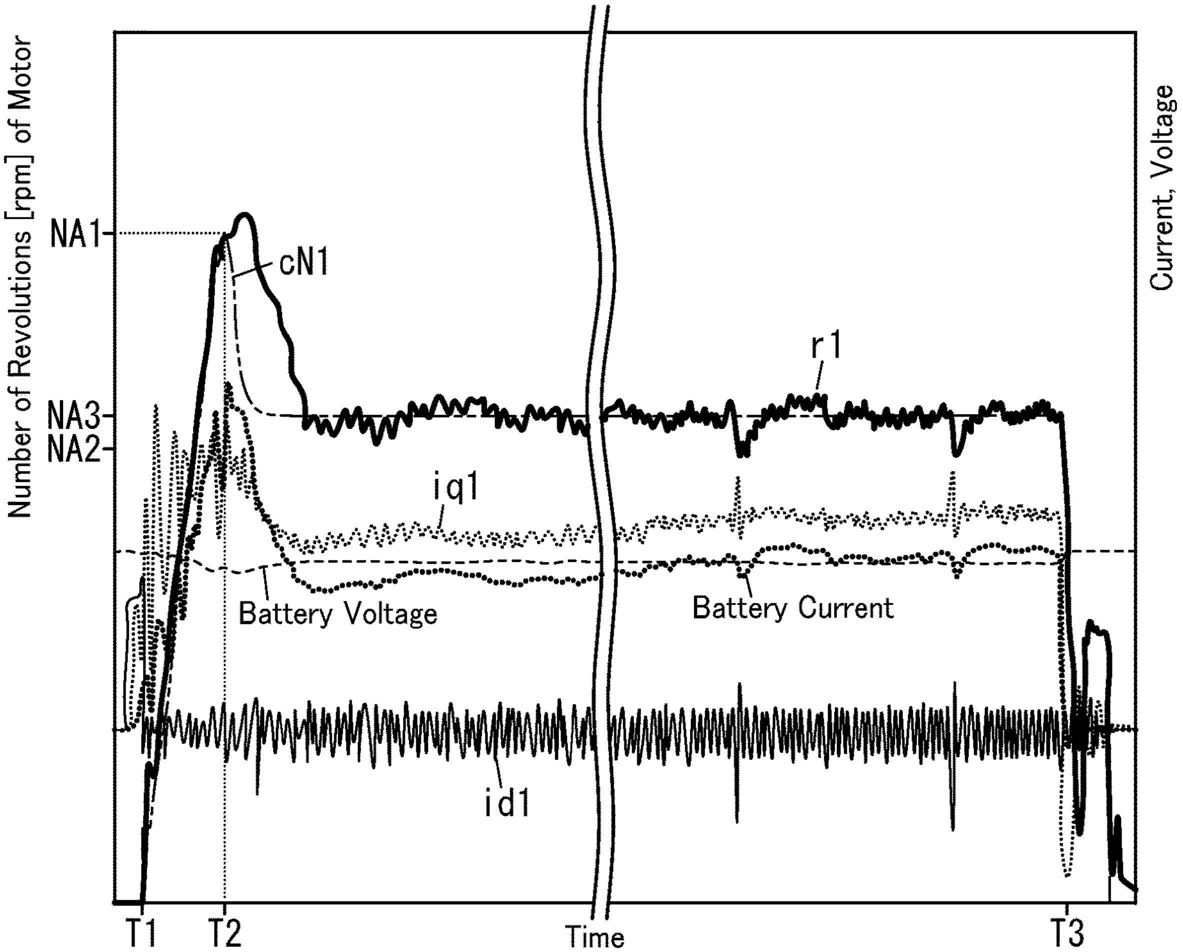
FIG. 7 is a graph showing a fourth exemplary operation of the electric power tool.

FIGS. 4-7 show how the respective parameters change with time when the electric power tool 1 is made to operate. The specifics of control performed by the control unit 4 on the AC motor 15 are different from each other in FIGS. 4-7. In FIGS. 5-7, the "battery current" refers to the output current of the power supply 32 of the electric power tool 1 and the "battery voltage" refers to the output voltage of the power supply 32. In FIGS. 4-7, "iq1" represents the current measured value iq1 and "id1" represents the current measured value id1. Also, in FIGS. 4-7, "r1" represents the number of revolutions of the AC motor 15. In FIGS. 4,6, and 7, shown is the command value cN1 of the number of revolutions of the AC motor 15. As used herein, the command value cN1 is a value obtained by converting the command value cω1 of the angular velocity of the AC motor 15 into the number of revolutions. In FIG. 5, the command value cN1 of the number of revolutions is not shown because the command value cN1 of the number of revolutions substantially agrees with the number of revolutions r1. Although not shown, in FIGS. 4-7, the command value cid1 of the d-axis current (see FIG. 1) is always equal to zero. Note that FIG. 4 shows an exemplary operation performed when a wood screw is driven into a member by using the electric power tool 1. Meanwhile, FIGS. 5-7 show exemplary operations performed when a target (which does not have to be a wood screw) is driven into a member by using the electric power tool 1.

The impact detecting unit 49 determines whether or not the impact mechanism 17 is performing any impact operation. Specifically, the impact detecting unit 49 outputs a result of detection (as an impact detection signal b1) that the impact mechanism 17 should be performing an impact operation when finding the time it takes, since one of the following first and second conditions has been satisfied, to satisfy the other of the first and second conditions equal to or less than a predetermined time. Otherwise, the impact detecting unit 49 outputs a result of detection that the impact mechanism 17 should not be performing any impact operation. Specifically, the first condition is that the absolute value of the current measured value id1 calculated by the second coordinate transformer 45 be greater than a predetermined d-axis threshold value Idt1 (hereinafter simply referred to as a "threshold value Idt1" (see FIG. 4)). The second condition is that the absolute value of the current measured value iq1 calculated by the second coordinate transformer 45 be greater than a predetermined q-axis threshold value Iqt1 (hereinafter simply referred to as a "threshold value Iqt1" (see FIG. 4)). In other words, the impact detecting unit 49 detects, when finding a time lag between a timing when the first condition on the current measured value id1 of the d-axis current is satisfied and a timing when the second condition on the current measured value iq1 of the q-axis current is satisfied equal to or less than a predetermined value, that the impact operation is being performed. That is to say, in such a situation, the impact detecting unit 49 derives a decision result that the impact mechanism 17 should be performing an impact operation. The threshold value Idt1 and the threshold value Iqt1 may be stored in, for example, a memory of a microcontroller serving as the control unit 4.

Once the impact mechanism 17 has started the impact operation, respective pulsating components of the d-axis current and q-axis current and their corresponding pulsating components of current measured values id1, iq1 increase, compared to their values before the impact operation is started. The increase in pulsating components sometimes makes the absolute value of the current measured value id1 larger than the threshold value Idt1 and makes the absolute value of the current measured value iq1 larger than the threshold value Iqt1. Thus, a decision may be made, by comparing the current measured values id1, iq1 with the threshold values Idt1, Iqt1, respectively, whether or not the impact operation is being performed.

The predetermined time may be about 100 ms, about 50 ms, or about 10 ms, for example. The current measured values id1, iq1 are output every predetermined sampling period. The impact detecting unit 49 determines, by, for example, counting the number of times the current measured values id1, iq1 have been output, whether or not the predetermined time has passed. For example, the predetermined time may be equal in length to one sampling period of the current measured value id1 or the current measured value iq1. In a situation where the respective sampling timings of the current measured values id1, iq1 are in synch with each other, the impact detecting unit 49 may detect that an impact operation is being performed if the first condition and the second condition are both satisfied at a timing of sampling the current measured values id1, iq1.

As can be seen, the impact detecting unit 49 determines, based on at least the current measured value id1 of the d-axis current, whether or not the impact operation is being performed. Also, the impact detecting unit 49 according to this embodiment determines, based on both the current measured value id1 of the d-axis current and the current measured value iq1 of the q-axis current, whether or not the impact operation is being performed. More specifically, when finding at least one (e.g., both in this embodiment) of the absolute value of the current measured value id1 of the d-axis current or the absolute value of the current measured value iq1 of the q-axis current greater than their corresponding threshold value, the impact detecting unit 49 detects that an impact operation is being performed. The threshold value with respect to the absolute value of the current measured value id1 is the threshold value Idt1 and the threshold value with respect to the absolute value of the current measured value iq1 is the threshold value Iqt1.

A transition from a state where the impact detecting unit 49 detects that no impact operation is being performed to a state where the impact detecting unit 49 detects that an impact operation is being performed corresponds to detecting a start of the impact operation. That is to say, the impact detecting unit 49 detects, based on at least one of the current measured value id1 of the d-axis current or the current measured value iq1 of the q-axis current, that an impact operation has been started.

It is not until a predetermined masking period Tm1 (see FIG. 4) passes since the AC motor 15 has started running (i.e., has started turning) that the impact detecting unit 49 starts determining whether or not the impact mechanism 17 is performing any impact operation. This allows, even if the current measured value iq1 of the q-axis current increases temporarily when the AC motor 15 starts running, an increase caused by the impact operation in the current measured value iq1 to be distinguished from an increase in the current measured value iq1 when the AC motor 15 starts running.

In each of FIGS. 4-7, when the user performs the operation of pulling the trigger volume 29 of the electric power tool 1 at a point in time T1, the AC motor 15 starts turning. After that, the number of revolutions r1 increases gradually according to the manipulative variable with respect to the trigger volume 29. In this case, the manipulative variable with respect to the trigger volume 29 is supposed to be maximum Thus, the number of revolutions r1 increases to the upper limit of an adjustable range. Around a point in time T2, the impact mechanism 17 starts an impact operation, which is detected by the impact detecting unit 49. That is to say, around the point in time T2, the absolute value of the current measured value id1 exceeds the threshold value Idt1, and the absolute value of the current measured value iq1 exceeds the threshold value Iqt1 substantially simultaneously.

When the impact detecting unit 49 detects a start of the impact operation, the parameter specifying unit 41 changes the magnitude of the proportional gain of the velocity control unit 42 from the first proportional gain into the second proportional gain, thus decreasing the proportional gain. In addition, in this situation, the parameter specifying unit 41 changes the magnitude of the integral gain of the velocity control unit 42 from the first integral gain into the second integral gain, thus decreasing the integral gain. Furthermore, in this situation, the parameter specifying unit 41 changes the upper limit value of the command value of the velocity of the AC motor 15 from the first upper limit value into the second upper limit value, thus decreasing the upper limit value. That is to say, the control unit 4 decreases the number of revolutions r1 of the AC motor 15 from the point in time T2 on as shown in FIGS. 5-7. In the example shown in FIG. 4, when a predetermined standby time passes since the impact detecting unit 49 has detected an impact operation, the parameter specifying unit 41 changes the proportional gain, the integral gain, and the upper limit value of the command value of the velocity of the AC motor 15. FIG. 4 shows the respective parameters of the electric power tool 1 before the standby time passes. Therefore, the control unit 4 has not yet performed the control of decreasing the number of revolutions of the AC motor 15 at any of the respective points in time shown in FIG. 4.

(5) Exemplary Operation Performed from Start Through Stop of Rotation

In FIGS. 5-7, the magnitude of the first proportional gain is the same and greater than zero. In FIG. 5, the magnitude of the second proportional gain is equal to that of the first proportional gain. In FIGS. 6 and 7, the magnitude of the second proportional gain is one-tenth of that of the first proportional gain.

In FIGS. 5-7, the magnitude of the integral gain (first integral gain) of the velocity control unit 42 in the preceding period is supposed to be Kc. Also, in FIGS. 5-7, the upper limit value (first upper limit value) of the command value of the angular velocity of the AC motor 15 in the preceding period is NA1×2π/60 [rad/s]. That is to say, in FIGS. 5-7, the first integral gain has the same magnitude, and the first upper limit value is also the same.

Specifically, in FIG. 5, the magnitude of the integral gain (second integral gain) of the velocity control unit 42 in the following period is Kc. That is to say, the second integral gain is equal to the first integral gain. The number of revolutions r1 shown in FIG. 5 is the number of revolutions of the AC motor 15 when the upper limit value (second upper limit value) of the command value cω1 of the angular velocity of the AC motor 15 in the following period is NA2×2π/60 [rad/s]. The number of revolutions r2 shown in FIG. 5 is a reference value of the number of revolutions of the AC motor 15 in a situation where the first upper limit value and the second upper limit value are equal to each other (i.e., in a situation where the second upper limit value is NA1×2π/60 [rad/s]).

In FIGS. 6 and 7, the magnitude of the first integral gain is Kc, whereas the magnitude of the second integral gain is Kc/10. The number of revolutions r1 shown in FIG. 6 is the number of revolutions of the AC motor 15 in a situation where the second upper limit value is NA2×2π/60 [rad/s]. The number of revolutions r1 shown in FIG. 7 is the number of revolutions of the AC motor 15 in a situation where the second upper limit value is NA3×2π/60 [rad/s] (where NA2<NA3<NA1 is satisfied).

In each of FIGS. 5-7, when the user performs the operation of pulling the trigger volume 29 of the electric power tool 1 at the point in time T1, the AC motor 15 starts turning. After that, the number of revolutions r1 increases gradually according to the manipulative variable with respect to the trigger volume 29. In this case, the manipulative variable with respect to the trigger volume 29 is supposed to be maximum Thus, the number of revolutions r1 increases to the upper limit of an adjustable range. Around a point in time T2, the impact mechanism 17 starts an impact operation, which is detected by the impact detecting unit 49. Thus, from the point in time T2 on, the command value cω1 of the angular velocity will be the second upper limit value. That is to say, from the point in time T2 on, the command value cN1 of the number of revolutions will be NA2 [rpm] in FIG. 5, the command value cN1 will be NA2 [rpm] in FIG. 6, and the command value cN1 will be NA3 [rpm] in FIG. 7. When the user reduces the manipulative variable of the trigger volume 29 to zero at a point in time T3, the AC motor 15 stops running.

During the design stage of the electric power tool 1, the second proportional gain, the second integral gain, and the second upper limit value are determined to stabilize both the number of revolutions r1 and the q-axis current since the impact operation has been started. FIGS. 5-7 show the results of trials that were carried out during the design stage of the electric power tool 1. For example, in FIG. 5, the number of revolutions r1 has relatively insignificant pulsation and tends to be rather stable, while the current measured value iq1 of the q-axis current has relatively significant pulsation and tends to be rather unstable. In FIG. 6, the number of revolutions r1 has relatively significant pulsation and tends to be rather unstable, while the current measured value iq1 has relatively insignificant pulsation and tends to be rather stable. In FIG. 7, both the number of revolutions r1 and the current measured value iq1 have relatively insignificant pulsation and tend to be rather stable. Thus, during the design stage of the electric power tool 1, the magnitude of the second proportional gain is determined to be one-tenth of that of the first proportional gain, the magnitude of the second integral gain is determined to be Kc/10, and the second upper limit value is determined to be NA3×2π/60 [rad/s] based on the result of the trials (e.g., as in FIG. 7).

In the electric power tool 1 according to the exemplary embodiment described above, the control unit 4 changes the control gain in the following period from the control gain in the preceding period. More specifically, at the transition from the preceding period to the following period, the control unit 4 changes at least one of a proportional gain or an integral gain as the control gain. This allows controlling the AC motor 15 more precisely, compared to a situation where the control gain in the preceding period is equal to the control gain in the following period. In addition, the control unit 4 changes the upper limit value of the command value cω1 (velocity command value) of the angular velocity in the following period from the upper limit value of the command value cω1 of the angular velocity in the preceding period. More specifically, the control unit 4 changes the upper limit value from the first upper limit value into the second upper limit value. This allows controlling the AC motor 15 even more precisely. For example, determining, during the design stage of the electric power tool 1, the second proportional gain, the second integral gain, and the second upper limit value according to the specification of the impact mechanism 17 contributes to stabilizing the number of revolutions and q-axis current of the AC motor 15 after an impact operation has been started, thus allowing the magnitude of the impacting force to be stabilized as well. In addition, stabilizing the magnitude of the impacting force allows lightening the burden placed on the impact mechanism 17 as well. Typically, making the second proportional gain smaller than the first proportional gain, making the second integral gain smaller than the first integral gain, and making the second upper limit value smaller than the first upper limit value contribute to stabilizing the number of revolutions and q-axis current of the AC motor 15. Also, typically, changing the proportional gain among various control gains will stabilize the magnitude of the impacting force more effectively than changing the integral gain.

Furthermore, making the control gain in the following period smaller than the control gain in the preceding period allows circuit components of the control unit 4 to have a relatively small current capacity.

Moreover, lowering the control gain and the upper limit value of the velocity of the AC motor 15 in the following period may also reduce the chances of applying excessive force to the impact mechanism 17.

Furthermore, determining the second proportional gain, the second integral gain, and the second upper limit value according to, for example, the type, weight, and size of the tip tool and the type of the load as a workpiece allows the number of revolutions and q-axis current of the AC motor 15 to be stabilized after an impact operation has been started. Examples of types of loads include wood screws and bolts. The user may switch the second proportional gain, the second integral gain, and the second upper limit value according to, for example, the type, weight, and size of the tip tool and the type of the load by operating the second setting unit 53.

In addition, the impact detecting unit 49 according to this embodiment determines, based on at least one of the current measured value id1 or the current measured value iq1, whether or not the impact operation is being performed. Thus, there is no need for the electric power tool 1 to measure the output current (battery current) of the power supply 32, for example, in order to determine whether or not the impact operation is being performed. In particular, the electric power tool 1 according to this embodiment adopts vector control of controlling, based on the current measured values id1, iq1 of the d-axis current and the q-axis current, the number of revolutions of the AC motor 15 and the current supplied to the AC motor 15. The vector control allows controlling the AC motor 15 even without measuring the output current of the power supply 32. Thus, the electric power tool 1 according to this embodiment achieves the advantage of enabling controlling the AC motor 15 and determining whether or not the impact operation is being performed even without being provided with a circuit for measuring the output current of the power supply 32. This contributes to reducing the areas and sizes of circuits provided for the electric power tool 1 and cutting down the cost of the circuits required. Nevertheless, the electric power tool 1 may include a circuit for measuring the output current of the power supply 32 as an optional constituent element. Also, the impact detecting unit 49 may also determine, based on the output current of the power supply 32, whether or not the impact operation is being performed.

Figure 8B:
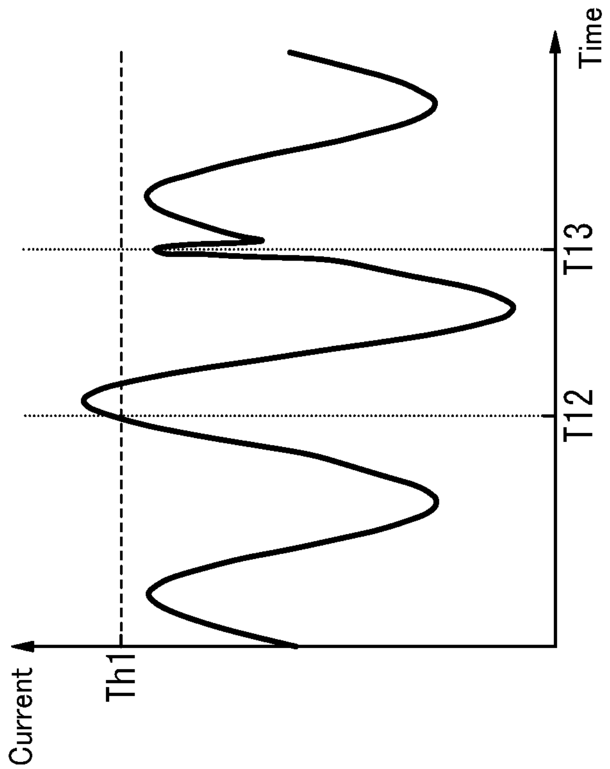
FIG. 8B is a graph showing a measured value of the output current of the inverter circuit section in the electric power tool.
Figure 8A:
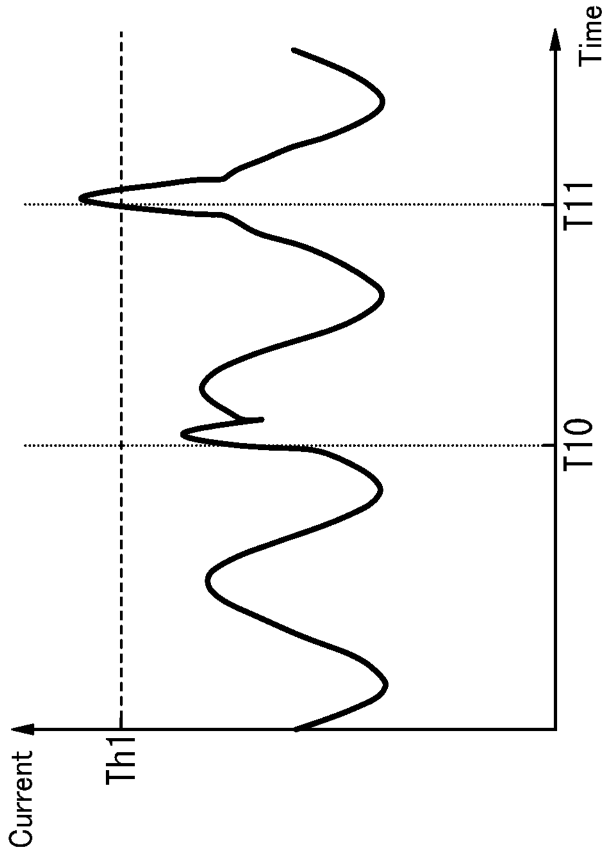
FIG. 8A is a graph showing a measured value of an output current of an inverter circuit section in the electric power tool.

Furthermore, making the impact detecting unit 49 determine, based on at least one of the current measured value id1 or the current measured value iq1, whether or not the impact operation is being performed may increase the detection accuracy, compared to determining, based on the output current (namely, a U-phase current, a V-phase current, or a W-phase current) of the inverter circuit section 51, whether or not the impact operation is being performed. FIGS. 8A and 8B show exemplary measured values of the output current of the inverter circuit section 51. Suppose a situation where the impact operation is detected by the impact detecting unit 49 when the measured value of the output current of the inverter circuit section 51 is greater than a predetermined threshold value Th1.

In FIG. 8A, actually, the impact mechanism 17 starts the impact operation at a point in time T10, and therefore, a pulsation component is superposed on the measured value. Nevertheless, the point in time T10 is not in the vicinity of a peak point of the waveform. Thus, even if the pulsation component is superposed on the measured value, the measured value is still less than the threshold value Th1 and the impact operation is not detected at this time. At a point in time T11, a pulsation component is superposed on the measured value in the vicinity of a peak point of the waveform, thus making the measured value greater than the threshold value Th1. As a result, the impact operation is detected. That is to say, the impact operation is detected at the point in time T11, which is later than the point in time T10 that is the starting point of the impact operation.

In FIG. 8B, actually, the impact mechanism 17 starts the impact operation at a point in time T13, and therefore, a pulsation component is superposed on the measured value. However, due to distortion in the waveform of the output current of the inverter circuit section 51, the measured value exceeds the threshold value Th1, and the impact operation is detected, at a point in time T12 prior to the point in time T13. Meanwhile, the point in time T13 is not in the vicinity of a peak point of the waveform. Thus, even if the pulsation component is superposed on the measured value, the measured value is still less than the threshold value Th1 and the impact operation is not detected at this time.

That is to say, according to the method of determining, based on the output current of the inverter circuit section 51, whether or not the impact operation is being performed, unless the pulsation component is superposed in the vicinity of a peak point of the waveform, the decision made about whether or not the impact operation is being performed may be mistaken. On the other hand, determining, based on at least one of the current measured value id1 or the current measured value iq1, whether or not the impact operation is being performed as is done in this embodiment may increase the chances of accurately determining whether or not the impact operation is being performed. That is to say, the detection accuracy of the pulsation components of the d-axis current and the q-axis current is sometimes higher than the detection accuracy of the pulsation component of the output current of the inverter circuit section 51. Thus, the electric power tool 1 according to this embodiment may more accurately determine whether or not the impact operation is being performed.

First Variation of Exemplary Embodiment

Next, a first variation of the exemplary embodiment will be described with reference to FIGS. 4 and 9. Note that FIG. 9 shows an exemplary operation to be performed in a situation where a bolt is driven into a member by using the electric power tool 1.

An impact detecting unit 49 according to the first variation detects the impact operation when finding the magnitude(s) of the AC component(s) of at least one (e.g., both in this variation) of the current measured value id1 of the d-axis current or the current measured value iq1 of the q-axis current greater than their corresponding threshold value. In this variation, the impact detecting unit 49 estimates the magnitude of the AC component by the effective value of the AC component. The AC components of the current measured values id1, iq1 have a frequency equal to or higher than the number of revolutions of the output shaft 21 of the electric power tool 1. As in the exemplary embodiment described above, it is not until the masking period Tm1 passes since the AC motor 15 has started running that the impact detecting unit 49 starts determining whether or not the impact mechanism 17 is performing any impact operation.

Figure 9:
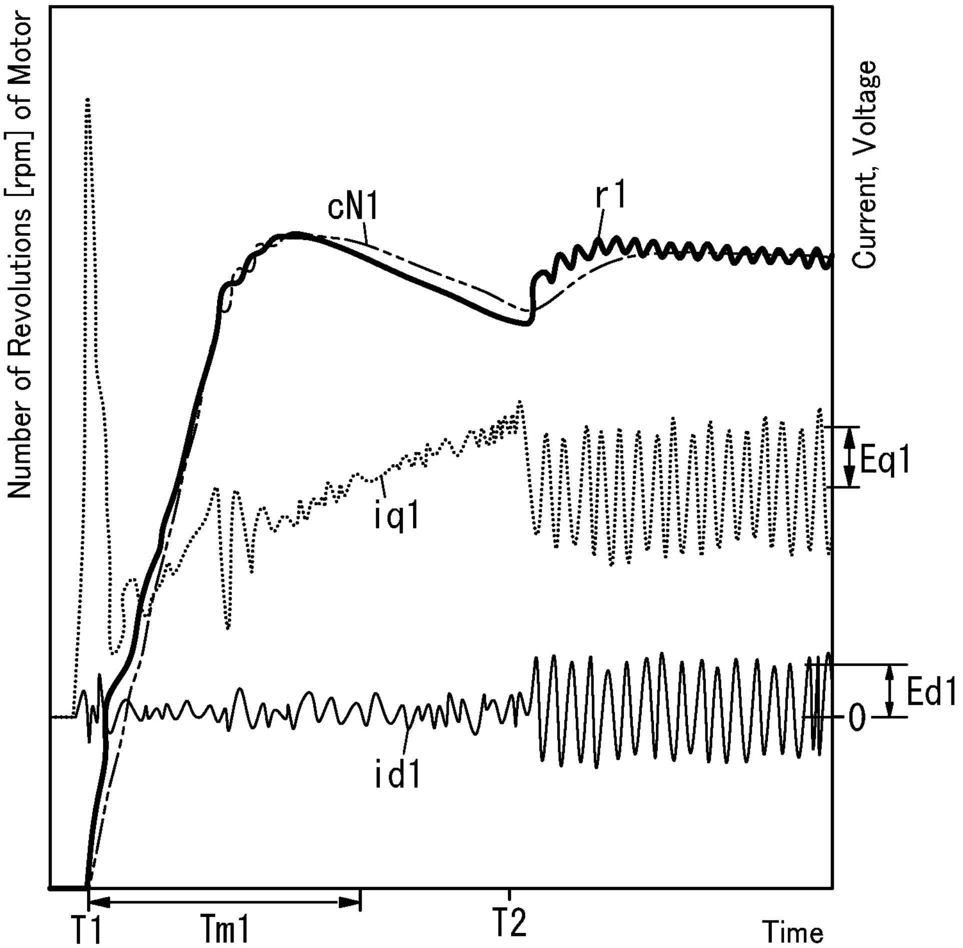
FIG. 9 is a graph showing an exemplary operation of an electric power tool according to a first variation.

FIGS. 4 and 9 show the effective value Ed1 of the AC component of the current measured value id1 and the effective value Eq1 of the AC component of the current measured value iq1. Once the impact mechanism 17 has started the impact operation, the effective values Ed1, Eq1 of the AC components may increase, compared to the values before the impact operation is started. Thus, a decision about whether or not the impact operation is being performed may be made by comparing the effective value Ed1 with a corresponding threshold value thereof and comparing the effective value Eq1 with a corresponding threshold value thereof.

Specifically, the impact detecting unit 49 obtains the effective values Ed1, Eq1 by making the following calculation:

$$Ed1, Eq1=\sqrt{\mathrm{RMS}^2-\mathrm{AVG}^2}$$

Each of the current measured values id1, iq1 may include a DC component and an AC component. “RMS” is an effective value of the current measured value id1, iq1 during their predetermined period and “AVG” is the average of the current measured value id1, iq1 during their predetermined period.

Specifically, the effective value Ed1 of the AC component of the current measured value id1 may be obtained by subtracting the mean square of the current measured value id1 of the d-axis current from the square of the effective value of the current measured value id1 of the d-axis current and then calculating the root of their difference. Likewise, the effective value Eq1 of the AC component of the current measured value iq1 may be obtained by subtracting the mean square of the current measured value iq1 of the q-axis current from the square of the effective value of the current measured value iq1 of the q-axis current and then calculating the root of their difference.

The impact detecting unit 49 determines, based on the effective values Ed1, Eq1 thus obtained, whether or not the impact mechanism 17 is performing any impact operation. That is to say, the impact detecting unit 49 outputs a result of detection that the impact mechanism 17 should be performing an impact operation when finding the time it takes, since one of the following two conditions has been satisfied, to satisfy the other condition equal to or less than a predetermined time. Specifically, one of the two conditions is that the effective value Ed1 be greater than the first threshold value. The other of the two conditions is that the effective value Eq1 be greater than the second threshold value. In FIGS. 4 and 9, the impact mechanism 17 starts the impact operation in the vicinity of the point in time T2, for example, which is detected by the impact detecting unit 49.

Optionally, a filter circuit including a high-pass filter may be provided for the control unit 4 and the current measured values id1, iq1 may be passed through the filter circuit to acquire the effective values Ed1, Eq1 of their AC components.

As can be seen from the foregoing description, the impact detecting unit 49 according to this variation determines, by monitoring the magnitudes of the effective values Ed1, Eq1, whether or not the impact operation is being performed. Thus, according to this first variation, even if the magnitude of the DC component of the current measured value id1, iq1 either does not increase, or increases relatively insignificantly, at the start of the impact operation, the decision may also be made about whether or not the impact operation is being performed.

Optionally, according to this first variation, the impact detecting unit 49 may estimate the magnitude of the AC component by the amplitude of the AC component. That is to say, the impact detecting unit 49 may compare, instead of the effective value Ed1, Eq1, at least one of the amplitude of the AC component of the current measured value id1 or the amplitude of the AC component of the current measured value iq1 with their corresponding threshold value. More specifically, the impact detecting unit 49 may detect the impact operation when finding at least one of the amplitude of the AC component of the current measured value id1 of the d-axis current or the amplitude of the AC component of the current measured value iq1 of the q-axis current greater than their corresponding threshold value.

Second Variation of Exemplary Embodiment

Next, a second variation of the exemplary embodiment will be described.

An impact detecting unit 49 according to this second variation weights a first decision result about the current measured value id1 of the d-axis current and a second decision result about the current measured value iq1 of the q-axis current to mutually different degrees, and determines, based on the first and second decision results thus weighted to mutually different degrees, whether or not the impact operation is being performed. Nevertheless, as in the exemplary embodiment described above, it is not until a masking period Tm1 passes since the AC motor 15 has started running that the impact detecting unit 49 starts determining whether or not the impact mechanism 17 is performing any impact operation.

The first decision result may be, for example, a result of comparison between the current measured value id1 and the threshold value Idt1. The second decision result may be, for example, a result of comparison between the current measured value iq1 and the threshold value Iqt1. The impact detecting unit 49 may weight the first decision result more heavily than the second decision result, for example.

In a specific example, if the absolute value of the current measured value id1 is greater than the threshold value Idt1, then the impact detecting unit 49 detects, irrespective of the magnitude of the current measured value iq1, that an impact operation is being performed. That is to say, the impact detecting unit 49 regards the decision result that the absolute value of the current measured value id1 is greater than the threshold value Idt1 as being more important than the decision result about the current measured value iq1. Thus, if the decision result that the absolute value of the current measured value id1 is greater than the threshold value Idt1 has been derived, a decision is made as a final one, irrespective of the magnitude of the current measured value iq1, that an impact operation should be being performed.

On the other hand, in a situation where the absolute value of the current measured value id1 is equal to or less than the threshold value Idt1, the impact detecting unit 49 detects that an impact operation is being performed when finding the absolute value of the current measured value id1 greater than a predetermined threshold value and the absolute value of the current measured value iq1 greater than the threshold value Iqt1. The predetermined threshold value is smaller than the threshold value Idt1.

Alternatively, the impact detecting unit 49 may weight the second decision result more heavily than the first decision result. The ratio of the weight of the first decision result to the weight of the second decision result may be determined, for example, during the design stage of the electric power tool 1. The more significantly the magnitude of the d-axis current changes before and after the impact operation, the more heavily the first decision result may be weighted. In the same way, the more significantly the magnitude of the q-axis current changes before and after the impact operation, the more heavily the second decision result may be weighted. Furthermore, the less significant the variation in the average of the current measured value id1 is, the more heavily the first decision result may be weighted. Likewise, the less significant the variation in the average of the current measured value iq1 is, the more heavily the second decision result may be weighted.

Third Variation of Exemplary Embodiment

Next, a third variation of the exemplary embodiment will be described.

An impact detecting unit 49 according to this third variation determines, based on the waveform of at least one of the current measured value id1 of the d-axis current or the current measured value iq1 of the q-axis current, whether or not the impact operation is being performed. More specifically, the impact detecting unit 49 compares the current measured value id1 with a model waveform of the d-axis current and also compares the current measured value iq1 with a model waveform of the q-axis current. The impact detecting unit 49 detects, when finding at least one of the degree of matching between the current measured value id1 and its model waveform or the degree of matching between the current measured value iq1 and its model waveform equal to or greater than a predetermined value, that an impact operation is being performed.

The model waveform of the d-axis current and the model waveform of the q-axis current may each be, for example, a waveform pattern in a period including at least one of a period just before an impact operation is started and a period right after the impact operation has been performed. That is to say, the impact detecting unit 49 determines, by detecting the feature quantity of the waveform of the current measured value id1, iq1 in at least one of the period just before an impact operation and the period right after the impact operation through comparison with the model waveform, whether or not the impact operation is being performed. The model waveform of the d-axis current and the model waveform of the q-axis current are stored in advance in, for example, a memory of a microcontroller serving as the control unit 4.

Optionally, the impact detecting unit 49 may determine, by changing the model waveforms to use according to a parameter such as the magnitude of a torque applied to the AC motor 15 or the number of revolutions of the AC motor 15, whether or not the impact operation is being performed.

Fourth Variation of Exemplary Embodiment

Next, a fourth variation of the exemplary embodiment will be described.

An impact detecting unit 49 according to this fourth variation detects, when finding that a condition on at least one of the current measured value id1 of the d-axis current or the current measured value iq1 of the q-axis current is satisfied a predetermined number of times or more, that an impact operation is being performed. That is to say, each of the current measured value id1 and the current measured value iq1 is output every predetermined sampling period. Thus, every time the current measured value id1, iq1 is output, the impact detecting unit 49 determines whether or not the current measured value id1 and/or the current measured value iq1 satisfies the above-described condition. When the number of times the condition is satisfied reaches a predetermined count or more, the impact detecting unit 49 detects that an impact operation is being performed. Note that when the AC motor 15 stops running, the count is reset (to zero again).

The condition may be, for example, that the first condition and the second condition described for the exemplary embodiment be satisfied. The first condition is that the absolute value of the current measured value id1 be greater than the threshold value Idt1. The second condition is that the absolute value of the current measured value iq1 be greater than the threshold value Iqt1.

Nevertheless, as in the exemplary embodiment described above, it is not until a masking period Tm1 passes since the AC motor 15 has started running that the impact detecting unit 49 starts determining whether or not the impact mechanism 17 is performing any impact operation.

Optionally, the impact detecting unit 49 may detect, when finding the condition satisfied at least the predetermined number of times within a prescribed period, that an impact operation is being performed. For example, the impact detecting unit 49 may reset the count indicating the number of times the condition is satisfied, every time a certain time passes.

Fifth Variation of Exemplary Embodiment

Next, a fifth variation of the exemplary embodiment will be described.

An impact detecting unit 49 according to this fifth variation detects, when finding that a condition on at least one of the current measured value id1 of the d-axis current or the current measured value iq1 of the q-axis current is satisfied for a prescribed time or more, that an impact operation is being performed. The condition may be, for example, that the first condition and the second condition described for the exemplary embodiment be satisfied.

Nevertheless, as in the exemplary embodiment described above, it is not until a masking period Tm1 passes since the AC motor 15 has started running that the impact detecting unit 49 starts determining whether or not the impact mechanism 17 is performing any impact operation.

The impact detecting unit 49 detects, when finding that the condition is satisfied continuously for a prescribed time, for example, that the impact operation is being performed. As used herein, the phrase "satisfied continuously" means that the length of the time it takes, since the condition has been satisfied once at a certain point in time, for the same condition to be satisfied next time is equal to or less than a predetermined threshold value. That is to say, the phrase "satisfied continuously" covers not only a situation where the condition is always kept satisfied but also a situation where the condition is not satisfied just temporarily.

Alternatively, the impact detecting unit 49 may detect, when finding that the condition is satisfied intermittently so that the sum of the periods for which the condition is satisfied amounts to the prescribed time, that an impact operation is being performed.

Other Variations of Exemplary Embodiment

Next, other variations of the exemplary embodiment will be enumerated one after another. Optionally, two or more of the variations to be described below may be adopted in combination as appropriate. Also, any of the variations to be described below may be adopted as appropriate in combination with at least one of the first to fifth variations described above.

The parameter specifying unit 41 does not have to change the command value cω1 indirectly by changing either the upper limit value or the lower limit value of the command value cω1 of the angular velocity when a transition is made from the preceding period to the following period. Alternatively, the parameter specifying unit 41 may also change the command value cω1 directly.

The parameter specifying unit 41 does not have to change the control gain of the velocity control unit 42 when a transition is made from the preceding period to the following period. Alternatively, the parameter specifying unit 41 may also change the control gain of the current control unit 43. Still alternatively, the parameter specifying unit 41 may also change both the control gain of the velocity control unit 42 and the control gain of the current control unit 43 when a transition is made from the preceding period to the following period. For example, the parameter specifying unit 41 may make the control gain of the current control unit 43 in the following period smaller than the control gain of the current control unit 43 in the preceding period.

The control unit 4 may change, when a predetermined time passes since the impact detecting unit 49 has detected that the impact mechanism 17 has started the impact operation, the target parameters (namely, the control gain and the upper limit value of the command value cω1 of the angular velocity).

The control unit 4 may change, when the impact detecting unit 49 detects, during the following period, that the impact mechanism 17 has finished the impact operation, the target parameters (namely, the control gain and the upper limit value of the command value cω1 of the angular velocity) into the values in the preceding period again. Alternatively, at this time, the control unit 4 may also change the target parameters into values different from the values in the preceding period and the values in the following period.

The function of accepting a command entered to determine the target parameters in the following period does not have to be distributed in the first setting unit 52 and the second setting unit 53. Alternatively, the function may be aggregated in either the first setting unit 52 or the second setting unit 53.

The electric power tool 1 may be configured to use, as the power supply 32, any one of multiple types of batteries. This allows the user to change the second proportional gain, the second integral gain, and the second upper limit value according to the type of the battery by operating the second setting unit 53. That is to say, changing the second proportional gain, the second integral gain, and the second upper limit value according to the specification of the battery, for example, allows the impact operation to be stabilized, no matter which of those multiple types of batteries is used.

The threshold value (such as the threshold value Idt1, Iqt1) for use to determine whether or not the impact mechanism 17 is performing any impact operation may vary according to at least one of the time that has elapsed since the AC motor 15 has started turning, the current measured value id1, or the current measured value iq1. For example, the threshold value may vary according to the average of the current measured value id1 or the average of the current measured value iq1.

Alternatively, the threshold value may vary according to the magnitude of the difference between the current measured value id1 and the command value cid1 or the magnitude of the difference between the current measured value iq1 and the command value ciq1. For example, the threshold value Idt1 may be obtained by adding a certain value to the command value cid1. Likewise, the threshold value Iqt1 may be obtained by adding a certain value to the command value ciq1.

The impact detecting unit 49 may determine, based on either the current measured value id1 or the current measured value iq1 alone, whether or not the impact operation is being performed. Using only the current measured value id1 facilitates making the decision about whether or not the impact operation is being performed in a situation where the average of the current measured value id1 is stabilized and in a situation where the current measured value id1 changes significantly before and after the impact operation is started. Using only the current measured value iq1 facilitates making the decision about whether or not the impact operation is being performed in a situation where the average of the current measured value iq1 is stabilized and in a situation where the current measured value iq1 changes significantly before and after the impact operation is started. Furthermore, determining, based on both the current measured value id1 and the current measured value iq1, whether or not the impact operation is being performed as is done in the embodiment described above may reduce the chances of detecting, by mistake, that an impact operation is being performed, even though no impact operation is actually being performed.

The impact detecting unit 49 according to the exemplary embodiment described above detects, when finding the time lag between a timing when the first condition on the current measured value id1 of the d-axis current is satisfied and a timing when the second condition on the current measured value iq1 of the q-axis current is satisfied equal to or less than a predetermined time, that an impact operation is being performed. Alternatively, regardless of the time lag between these two timings, the impact detecting unit 49 may detect, when finding the first and second conditions satisfied, that an impact operation is being performed. This reduces the chances of the impact detecting unit 49 continuing to output a wrong detection result that no impact operation is being performed, even though an impact operation is actually being performed.

Optionally, the impact detecting unit 49 may determine, by using, in combination, two or more of the means for determining whether or not an impact operation is being performed as described in the exemplary embodiment and its variations, whether or not the impact operation is being performed.

Recapitulation

The embodiment and its variations described above may be specific implementations of the following aspects of the present disclosure.

An electric power tool 1 according to a first aspect includes an electric motor (AC motor 15), an impact mechanism 17, an impact detecting unit 49, and a measuring unit 60. The impact mechanism 17 performs an impact operation that generates impacting force by receiving motive power from the electric motor. The impact detecting unit 49 determines whether or not the impact operation is being performed. The measuring unit 60 measures at least one of a d-axis current or a q-axis current, each of which is supplied to the electric motor. The impact detecting unit 49 determines, based on at least one of a measured value (current measured value id1) of the d-axis current or a measured value (current measured value iq1) of the q-axis current, whether or not the impact operation is being performed. The measured value (current measured value id1) of the d-axis current and the measured value (current measured value iq1) of the q-axis current have been obtained by the measuring unit 60.

This configuration may provide a novel means for determining whether or not the impact mechanism 17 is performing any impact operation.

In an electric power tool 1 according to a second aspect, which may be implemented in conjunction with the first aspect, the impact detecting unit 49 detects, based on at least one of the measured value (current measured value id1) of the d-axis current or the measured value (current measured value iq1) of the q-axis current, that the impact operation has been started.

This configuration allows the electric power tool 1 to control the electric motor (AC motor 15) adaptively to the start of the impact operation.

An electric power tool 1 according to a third aspect, which may be implemented in conjunction with the second aspect, further includes a control unit 4. The control unit 4 includes the impact detecting unit 49. The control unit 4 performs feedback control on operation of the electric motor (AC motor 15). The control unit 4 changes, when the impact detecting unit 49 detects that the impact operation has been started, a control gain of the feedback control.

This configuration allows the electric motor (AC motor 15) to be controlled more precisely than in a situation where the control gain does not change at the start of the impact operation.

In an electric power tool 1 according to a fourth aspect, which may be implemented in conjunction with any one of the first to third aspects, the impact detecting unit 49 determines, based on the measured value (current measured value id1) of the d-axis current, whether or not the impact operation is being performed.

This configuration facilitates, when the current measured value id1 of the d-axis current varies significantly before and after the start of the impact operation, determining whether or not the impact operation is being performed.

In an electric power tool 1 according to a fifth aspect, which may be implemented in conjunction with the fourth aspect, the impact detecting unit 49 determines, based on both the measured value (current measured value id1) of the d-axis current and the measured value (current measured value iq1) of the q-axis current, whether or not the impact operation is being performed.

This configuration reduces the chances of detecting the impact operation erroneously in, for example, a situation where no impact operation is actually being performed.

In an electric power tool 1 according to a sixth aspect, which may be implemented in conjunction with the fifth aspect, the impact detecting unit 49 weights a first decision result about the measured value (current measured value id1) of the d-axis current and a second decision result about the measured value (current measured value iq1) of the q-axis current to mutually different degrees and determines, based on the first decision result and the second decision result that have been weighted, whether or not the impact operation is being performed.

This configuration contributes to more accurately determining whether or not the impact operation is being performed.

In an electric power tool 1 according to a seventh aspect, which may be implemented in conjunction with the fifth aspect, the impact detecting unit 49 detects, when finding a time lag between a timing when a condition on the measured value (current measured value id1) of the d-axis current is satisfied and a timing when a condition on the measured value (current measured value iq1) of the q-axis current is satisfied equal to or less than a predetermined time, that the impact operation is being performed.

This configuration contributes to more accurately determining whether or not the impact operation is being performed.

In an electric power tool 1 according to an eighth aspect, which may be implemented in conjunction with any one of the first to seventh aspects, the impact detecting unit 49 detects, when finding at least one of an absolute value of the measured value (current measured value id1) of the d-axis current or an absolute value of the measured value (current measured value iq1) of the q-axis current greater than a corresponding threshold value (threshold value Idt1, Iqt1), that the impact operation is being performed.

This configuration allows determining, by simple processing, whether or not the impact operation is being performed.

In an electric power tool 1 according to a ninth aspect, which may be implemented in conjunction with any one of the first to seventh aspects, the impact detecting unit 49 detects, when finding magnitude of an AC component of at least one of the measured value (current measured value id1) of the d-axis current or the measured value (current measured value iq1) of the q-axis current greater than a corresponding threshold value, that the impact operation is being performed.

This configuration still allows, even if the magnitude of a DC component of the current measured value id1, iq1 either does not increase or increases relatively insignificantly when the impact operation is started, determining whether or not the impact operation is being performed.

In an electric power tool 1 according to a tenth aspect, which may be implemented in conjunction with any one of the first to seventh aspects, the impact detecting unit 49 determines, based on a waveform of at least one of the measured value (current measured value id1) of the d-axis current or the measured value (current measured value iq1) of the q-axis current, whether or not the impact operation is being performed.

This configuration contributes to more accurately determining whether or not the impact operation is being performed.

In an electric power tool 1 according to an eleventh aspect, which may be implemented in conjunction with any one of the first to tenth aspects, the impact detecting unit 49 detects, when finding that a condition on at least one of the measured value (current measured value id1) of the d-axis current or the measured value (current measured value iq1) of the q-axis current is satisfied a predetermined number of times, that the impact operation is being performed. The predetermined number of times is equal to or greater than two.

This configuration contributes to more accurately determining whether or not the impact operation is being performed.

In an electric power tool 1 according to a twelfth aspect, which may be implemented in conjunction with any one of the first to eleventh aspects, the impact detecting unit 49 detects, when finding that a condition on at least one of the measured value (current measured value id1) of the d-axis current or the measured value (current measured value iq1) of the q-axis current is satisfied for a prescribed time or more, that the impact operation is being performed.

This configuration contributes to more accurately determining whether or not the impact operation is being performed.

Note that the constituent elements according to all aspects but the first aspect are inessential to the electric power tool 1 but may be omitted as appropriate.

REFERENCE SIGNS LIST

1 Electric Power Tool
4 Control Unit
15 AC Motor (Electric Motor)
17 Impact Mechanism
49 Impact Detecting Unit
60 Measuring Unit
id1 Current Measured Value (Measured Value)
iq1 Current Measured Value (Measured Value)
idt1 Threshold Value
iqt1 Threshold Value

The invention claimed is:

1. An electric power tool comprising:
an electric motor;
an impact mechanism configured to perform an impact operation that generates impacting force by receiving motive power from the electric motor;
an impact detecting unit configured to determine whether or not the impact operation is being performed; and
a measuring unit configured to measure at least one of a d-axis current or a q-axis current, each of the d-axis current and the q-axis current being supplied to the electric motor, wherein:
the impact detecting unit is configured to determine, based on at least one of a measured value of the d-axis current or a measured value of the q-axis current, whether or not the impact operation is being performed, the measured value of the d-axis current and the measured value of the q-axis current having been obtained by the measuring unit,
the impact detecting unit is configured to detect, based on at least one of the measured value of the d-axis current or the measured value of the q-axis current, that the impact operation has been started,
the electric power tool further comprises a control unit configured to perform feedback control on operation of the electric motor, and
the control unit is configured to, when the impact detecting unit detects that the impact operation has been started, change a control gain of the feedback control.

2. The electric power tool of claim 1, wherein
the impact detecting unit is configured to determine, based on the measured value of the d-axis current, whether or not the impact operation is being performed.

3. The electric power tool of claim 2, wherein
the impact detecting unit is configured to determine, based on both the measured value of the d-axis current and the measured value of the q-axis current, whether or not the impact operation is being performed.

4. The electric power tool of claim 3, wherein
the impact detecting unit is configured to weight a first decision result about the measured value of the d-axis current and a second decision result about the measured value of the q-axis current to mutually different degrees and determine, based on the first decision result and the second decision result that have been weighted, whether or not the impact operation is being performed.

5. The electric power tool of claim 3, wherein
the impact detecting unit is configured to, when finding a time lag between a timing when a condition on the measured value of the d-axis current is satisfied and a timing when a condition on the measured value of the q-axis current is satisfied equal to or less than a predetermined time, detect that the impact operation is being performed.

6. The electric power tool of claim 1, wherein
the impact detecting unit is configured to, when finding at least one of an absolute value of the measured value of the d-axis current or an absolute value of the measured value of the q-axis current greater than a corresponding threshold value, detect that the impact operation is being performed.

7. The electric power tool of claim 1, wherein
the impact detecting unit is configured to, when finding magnitude of an AC component of at least one of the measured value of the d-axis current or the measured value of the q-axis current greater than a corresponding threshold value, detect that the impact operation is being performed.

8. The electric power tool of claim 1, wherein
the impact detecting unit is configured to determine, based on a waveform of at least one of the measured value of the d-axis current or the measured value of the q-axis current, whether or not the impact operation is being performed.

9. The electric power tool of claim 1, wherein
the impact detecting unit is configured to, when finding that a condition on at least one of the measured value of the d-axis current or the measured value of the q-axis current is satisfied a predetermined number of times, detect that the impact operation is being performed, the predetermined number of times being equal to or greater than two.

10. The electric power tool of claim 9, wherein the predetermined number of times is twice.

11. The electric power tool of claim 9, wherein the impact detecting unit is configured to reset a number of times that the condition is satisfied at a predetermined interval.

12. The electric power tool of claim 1, wherein
the impact detecting unit is configured to, when finding that a condition on at least one of the measured value of the d-axis current or the measured value of the q-axis current is satisfied for a prescribed time or more, detect that the impact operation is being performed.

* * * * *